Nov. 28, 1939.  C. KAVALIR  2,181,697
BEVERAGE COOLER
Filed May 26, 1938
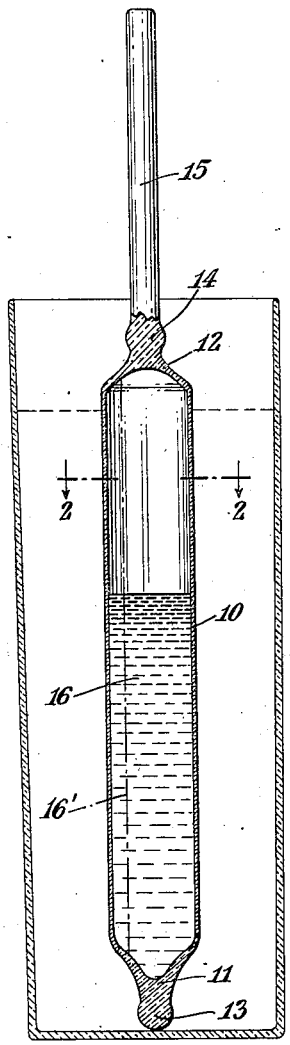
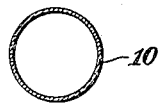
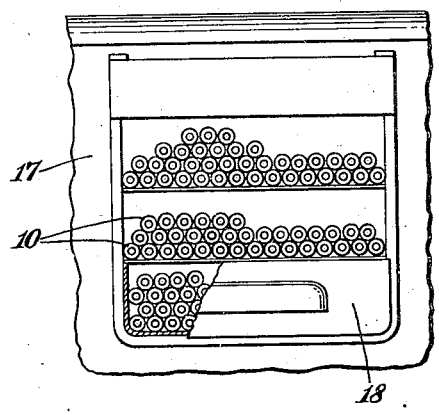
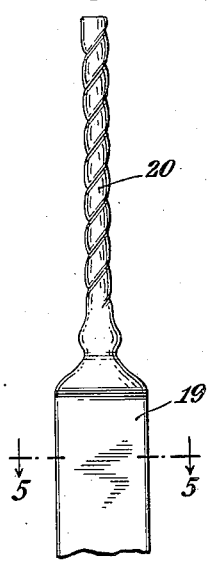
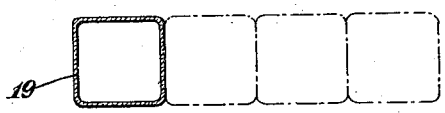
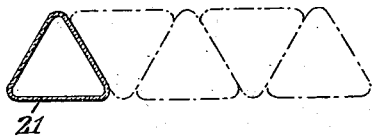
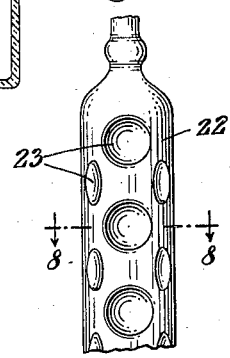
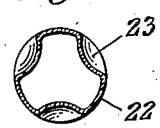
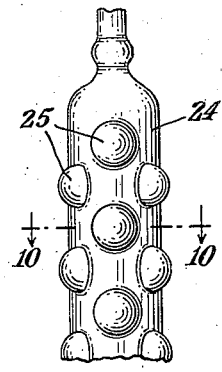
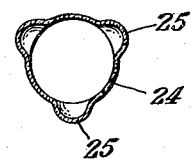
INVENTOR
*Charles Kavalir*
BY
*Paul M. Klein*
*his* ATTORNEY Patented Nov. 28, 1939

2,181,697

UNITED STATES PATENT OFFICE 2,181,697

BEVERAGE COOLER

Charles Kavalir, New York, N. Y.

Application May 26, 1938, Serial No. 210,130

3 Claims. (Cl. 62—1)

This invention relates to devices for imparting desired temperatures to liquids and the like, and especially to coolers for beverages and similar drinks.

Portable coolers or heating devices for beverages, and especially for beverages contained in drinking utensils, are well known. They usually consist of a hollow vessel, filled with a temperature exchange medium which may be either heated or frozen, whereupon the device is immersed into the beverage, to which latter the temperature of the exchange medium in the device is imparted. For cooling a beverage, the device takes the place of ice cubes, which ordinarily would dilute the beverage.

The present device is especially adapted for cooling beverages. It also consists of a vessel containing a freezable liquid. When the liquid is frozen or reaches the desired temperature, the device is immersed in the beverage to be cooled. A suitable handle extends from the body of the device.

The difference between the heretofore employed devices and the present invention resides in its improved construction and its outstanding advantages over the existing similar art. In the first place, it provides a proportionately large cooling area for a relatively small cross sectional area of the body of the vessel, taken transversely to its longitudinal axis. Secondly, the shape of the cross section of the device facilitates the placement of an uncommonly large number of coolers within a relatively small space, when the coolers are subjected to a freezing temperature. Thirdly, the freezing of the freezable liquid is preferably accomplished while the device lies horizontally, which procedure has decided advantages, since the frozen liquid then extends over the entire length of the vessel, whereby the effective transfer of low temperatures to the beverage to be cooled is effected over practically the entire depths of the beverage. As the ice melts, it floats to the upper portion of the device and effects the cooling of the beverage from the highermost point downwards. This is important, since it is known that the cooled liquid will descend to the bottom, while the warmer liquid will rise.

The fact that the freezing of the liquid within the vessel is accomplished while the vessel is lying horizontally effectively precludes the possibility of breakage, due to expansion of the liquid while freezing.

A further important advantage of my device, lies in its sturdy construction. The cooling body represents an elongated, substantially tubular vessel, which is reinforced at both of its sealed ends by a heavy accumulation of material, which reinforced ends terminate in sphere-shaped enlargements. The lowermost or free enlarged end is in the shape of a drop or ball, and the upper enlarged end forms a reinforced base for a handle which is relatively short, as compared with the length of the cooling body.

The most important objects of this invention reside in the provision of a sturdy, elongated, cooling vessel, provided with a handle, and wherein the sealed ends of the vessel are effectively reinforced, and wherein the handle, secured to one reinforced end of the vessel, is relatively short, and wherein the freezable element within the vessel is designed to congeal longitudinally, the vessel being so constructed and arranged as to facilitate the placement of the largest number of devices within a given space, without any, or an appreciable amount of waste space, preparatory to congealing the freezable liquid within the vessel.

The foregoing objects and still other important advantages of the device will become more fully apparent from the ensuing description and the accompanying drawing, forming an important part of my disclosure, but which drawing is by no means intended to limit me to the actual showing, and in which:

Fig. 1 is an elevation of my device, partially in section.

Fig. 2 is a section, taken on lines 2—2 through Fig. 1.

Fig. 3 illustrates a freezing compartment of a refrigerator wherein my devices are stacked for congealing the freezing medium within the vessels.

Fig. 4 is a fragmental illustration of a modified form of my device.

Fig. 5 is a section taken on lines 5—5 of Fig. 4, and indicating the arrangement of the modified form of my device when placed in a freezer.

Fig. 6 illustrates the cross section of still another modified form of my device and the storing arrangement thereof.

Fig. 7 is a fragmental illustration of another embodiment of my device.

Fig. 8 is a cross section taken on lines 8—8 of Fig. 7.

Fig. 9 is a fragmental illustration of still another embodiment of my device, and Fig. 10 is a cross section taken on lines 10—10 of Fig. 9.

Referring now particularly to Figs. 1, 2 and 3, numeral 10 denotes a cylindrical vessel, having reinforced sealed ends 11 and 12 in the shape of thickened cones, which latter terminate in globular or spherical enlargements 13 and 14, respectively. Lower enlargement 13, is preferably made in the form of a drop or ball. From the upper enlargement 14 extends a relatively short handle 15. Within the vessel there is trapped a body of liquid 16, which may be either pure water or any other readily freezable medium. This liquid may retain its natural color or may be tinted with a suitable coloring if desired. Handle 15, also may be in a different color or may retain its original coloring.

In Fig. 3, a freezing compartment 17, is shown, in which are seen beverage freezers of the construction illustrated in Fig. 1, and indicated at 10, in three different compartments. The upper compartments are merely shelves, while in the lower compartment a tray 18 is provided within which my beverage coolers are placed. It will be readily observed from this illustration, that for a comparatively small space, the number of beverage coolers is very large and that there is comparatively very little space loss between the bodies of the coolers. These coolers, while in their horizontal position are subjected to a freezing temperature, whereby the freezing liquid trapped in the vessels is caused to congeal longitudinally, as indicated at 16' in Fig. 1, so that when the device is in use, it will cool the beverage over the entire length of the vessel.

Fig. 4 illustrates a similar device to that just described, where, however, vessel 19 has a square cross section, indicated in Fig. 5. Handle 20, is twisted for ornamental effects, as well as for the purpose of preventing slippage. When the device is of a square cross section, there is still less space lost in stacking the coolers for freezing purposes, since the sides of the coolers abut with one another, as is clearly indicated in broken lines in Fig. 5.

A similar effect is achieved when the vessel has a triangular cross section 21, shown in Fig. 6, whereby the stacking of the coolers, in the manner illustrated in broken lines in that figure, is also instrumental in preventing waste of space.

Referring now to Figs. 7, 8, 9, and 10, in these illustrations I emphasize the possibility of increasing the effective cooling surface of the originally cylindrical vessel, by providing either indentations or exterior enlargements on the original surface. Thus, in Figs. 7 and 8, is shown an originally cylindrical vessel body 22, portions of which are depressed at 23. In Figs. 9 and 10 a similar cylindrical body 24 is shown, from which body extend outwards semi-spheres 25, which are so arranged that when the device is stacked, an effect similar to that shown in Fig. 6 is achieved.

In all of the figures I have indicated that the body of the vessel, as well as of the handle, is made of glass, inasmuch as glass is one of the most sanitary materials which may be used in the manufacture of my device. Nevertheless, it is quite obvious that my beverage cooler may be made of other materials, such as metal, Celluloid, or other moldable compositions, or that it may be made of a combination of two different materials, such as glass and metal. Also, the handle may be constructed of different material and may, indeed, be an independent portion of the device, if so desired.

In all events, however, it is essential that the effective portion of the device, i. e., the cooling vessel, must be substantially tubular and elongated, and that its length must be greater than the distance equalling two diameters or two diagonals, taken transversely through the largest cross section of the vessel. In other words, the vessel must be substantially longer than its cross section, since it is my intention that the effective cooling area should extend over the height or depth of the liquid to be cooled by my device. It is also my intention that the cooling of such liquid by my device should be effected from the warmest region of the beverage downwards.

An essential feature of my device is the reinforcement provided at the ends of the vessel, which reinforcement is advantageous not only for vessels made of glass, but also for vessels made from other material. This reinforcement represents a safety feature against inadvertent breakage, while the device is being used, or in the event it should be accidentally dropped. Tests have been conducted by dropping my device, made of glass, from a height of three to four feet on a bare wood floor, with the free reinforced end directed against the floor, without causing breakage. The sturdy construction of my device also facilitates its use for vigorous stirring of even thick beverages or liquids, such as chocolate, without detriment to the device.

While I have shown and described specific forms of my invention, it is understood that modification and changes may be made therein, and I therefore reserve for myself the right to make such changes and other improvement, without departing from the broad scope of my invention, as defined in the annexed claims.

I claim:

1. A cooling device for a relatively tall column of beverages or the like, comprising an elongated sealed vessel of a substantially uniform cross section and of a sufficient length to at least equal the height of such column, a congealable medium partially filling the vessel and adapted to be congealed while the vessel is in a substantially horizontal position.

2. In a device for cooling and for promoting circulation in a relatively tall column of beverages or the like, an elongated sealed hollow body of uniform cross section partially filled with a congealable medium, the latter being adapted to be congealed over the entire length of the body and while the body is in a substantially horizontal position, the length of the body being at least equal to the height of the column to be cooled, and reinforcements provided at both ends of the body.

3. In a device, as set forth in claim 2, and wherein one of the reinforced ends terminates in a spherical formation, while from the other end extends a handle.

CHARLES KAVALIR.